J. F. O'CONNOR.
FRICTION DRAFT RIGGING.
APPLICATION FILED JULY 30, 1909.
966,236.
Patented Aug. 2, 1910.
2 SHEETS—SHEET 2.
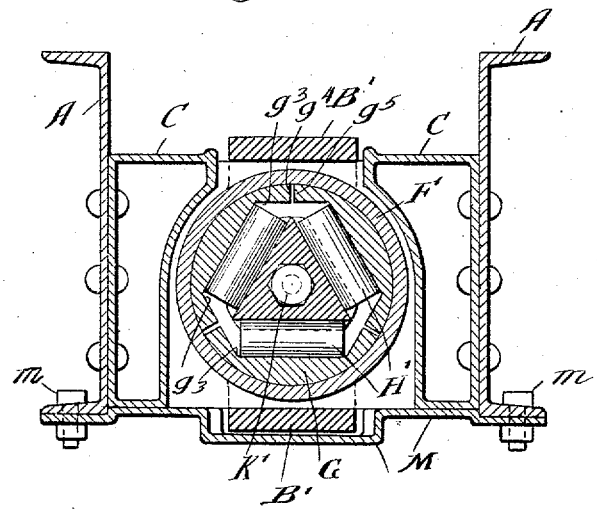
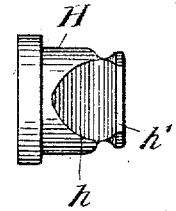
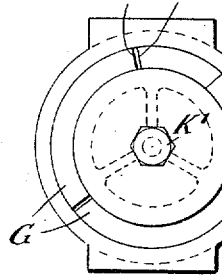
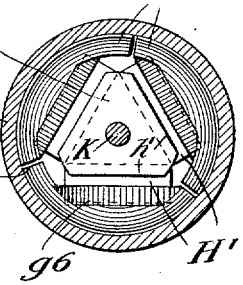
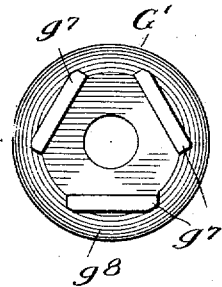
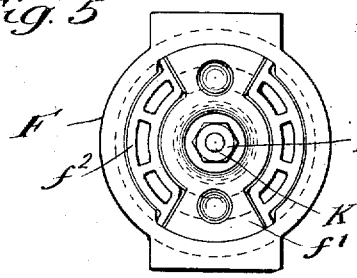
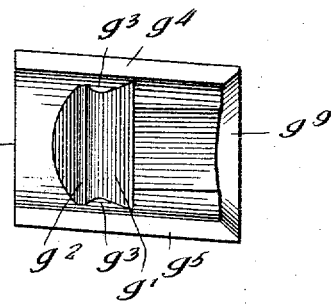
Witnesses:
Wm Geiger
H W Munday
Inventor:
John F. O'Connor
P. J. Munday, Evarts, Adcock & Clarke,
Attorneys

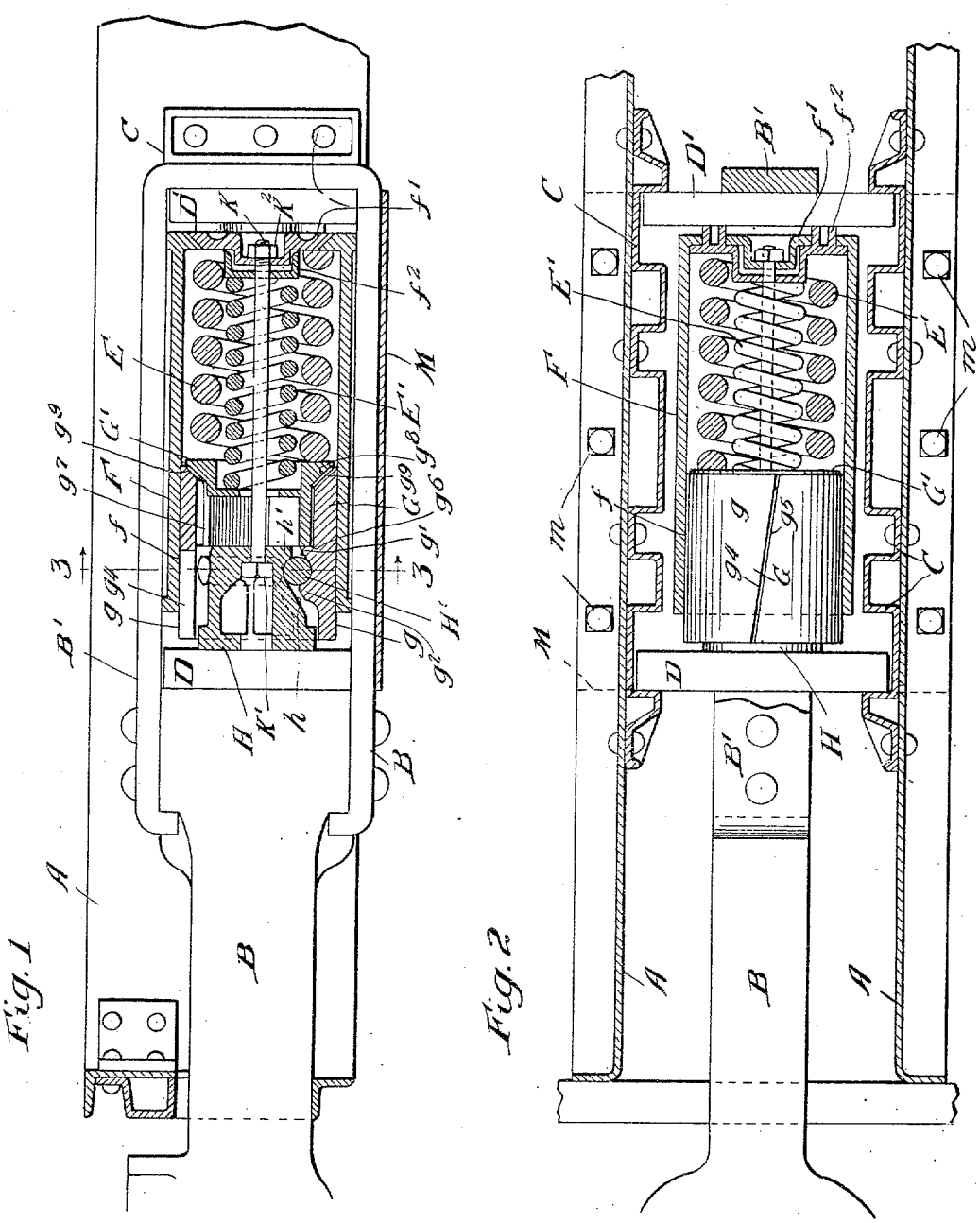

UNITED STATES PATENT OFFICE.

JOHN F. O'CONNOR, OF CHICAGO, ILLINOIS, ASSIGNOR, BY MESNE ASSIGNMENTS, TO WILLIAM H. MINER, OF CHICAGO, ILLINOIS.

FRICTION DRAFT-RIGGING.

966,236.  Specification of Letters Patent.  Patented Aug. 2, 1910.

Application filed July 30, 1909. Serial No. 510,359.

*To all whom it may concern:*

Be it known that I, JOHN F. O'CONNOR, a citizen of the United States, residing in Chicago, in the county of Cook and State of Illinois, have invented a new and useful Improvement in Friction Draft-Rigging, of which the following is a specification.

My invention relates to improvements in friction draft rigging for railway cars. Heretofore in friction draft rigging of the kind to which my invention particularly relates, and wherein a longitudinally arranged spring reacts at one end against a longitudinally movable friction shell, and at the other end against segmental friction shoes within the friction shell, the shoes being spread apart by a wedge with anti-friction rollers interposed between the wedge and the friction shoes, sometimes the grip-like pressure of the spring against the ends of the segmental friction shoes tends to prevent the inner ends of the friction shoes from properly moving outward under the spreading action of the wedge and rollers, thus producing an unequal bearing of the friction shoes against the friction shell from end to end of the shoes and consequent defective operation.

The object of my present invention is to remedy this difficulty or objection, which I do, and herein my invention consists, by providing the friction shoes with bearing shoulders near their middle, and interposing between the friction shoes and the adjacent end of the spring a spring-seat cap or disk furnished with a plurality of supporting arms or extensions which engage the shoulders on the friction shoes and thus support the same at their center or middle. Since the thrust or pressure of the spring against the friction shoes thus comes at the central or middle portion of the shoes instead of against the ends thereof as heretofore, it thereby leaves the inner ends of the shoes free to move outward under the spreading action of the wedge and rollers (which also bear against the center or middle portion of the shoes) and entirely overcomes all binding tendency of the spring at the inner ends of the shoes and insures certain and reliable action. The supporting arms, fingers or extensions on the spring-seat or cap may preferably be made comparatively wide and thin to permit a very slight or infinitesimal flexure thereof to further insure freedom of outward radial movement of the friction shoes to the slight extent necessary, so that the shoulders of the shoes will not be required to slide radially in respect to the inner ends of the fingers abutting against said shoulders.

My invention further consists in the novel construction of parts and devices and in the novel combinations of parts and devices herein shown and described.

In the accompanying drawing forming a part of this specification, Figure 1 is a side elevation, partly in longitudinal section, of a friction draft rigging embodying my invention. Fig. 2 is a plan view, partly in horizontal section. Fig. 3 is a cross section on line 3—3 of Fig. 1. Fig. 4 is a detail front elevation of the friction shell. Fig. 5 is a detail rear end view of the friction shell and adjacent parts. Fig. 6 is a plan view of the wedge. Fig. 7 is a detail cross section of the friction shell showing the rear ends of the friction shoes in elevation. Fig. 8 is a detail end view of the spring seat or cap which is interposed between the friction shoes and the spring; and Fig. 9 is a detail elevation of one of the friction shoes showing the inner side thereof.

In the drawing, A represents the draft sills or members of the car frame to which the draft rigging is applied, the same being preferably center sills, B the draw-bar, $B^1$ the draft yoke, C the draft lugs or stop members secured to the draft sills, D $D^1$ front and rear followers and E $E^1$ the springs.

F is a longitudinally movable friction shell interposed between the followers and having an internal cylindric friction face $f$.

G are segmental friction shoes, preferably three in number, each having an external friction face $g$ in sliding frictional engagement with the internal friction face of the shell F, and each having an inclined or wedge face $g^1$ parallel to and coöperating with one of the inclined faces $h$ of the wedge H, which is preferably three-faced or pyramidal.

$H^1$ are anti-friction rollers interposed between the inclined or wedging faces of the friction shoes G and wedge H, the rollers corresponding in number to the friction shoes. The friction shoes G each have a seat or shoulder $g^2$ to keep the rollers in place and the wedge H is provided with cooperating shoulders $h^1$; and the shoes G have also shoulders $g^3$ to keep the rollers in place lengthwise.

The segmental friction shoes G are preferably each an oblique segment of a cylinder so that their parallel meeting edges $g^4$ $g^5$ extend at an angle instead of parallel to the axis of the cylinder. This prevents unevenness of wear of the friction shell at the meeting edges of the segments as the segments reciprocate longitudinally in the friction shell.

The anti-friction rollers $H^1$ bear against the center or middle portion of the friction shoes G so that the thrust of the wedge H and rollers $H^1$ comes centrally against the shoes. The segmental friction shoes G are each provided with a central bearing shoulder $g^6$ on the inner face thereof, closely adjacent to the inclined or wedge face $g^1$ thereof against which the centrally bearing roller $H^1$ acts, and against which central bearing shoulders $g^6$ the thrust or pressure of the spring E comes and is transmitted to the friction shoe. Each of the friction shoes thus receives both the thrust of the draw-bar through the wedge and anti-friction roller and the thrust or pressure of the spring at its central or middle portion. To transmit the thrust or pressure of the spring E against the central or middle portion of each of the friction shoes, I provide and interpose between the inner end of the spring and the friction shoes a spring-seat disk or cap $G^1$ which is furnished with a plurality of thin, wide supporting arms or bearing fingers $g^7$, one of which bears at its inner end against the shoulder $g^6$ of each of the friction shoes G. The spring-seat or cap $G^1$ may preferably have an inner bevel face $g^8$ and the inner ends of the shoes G may also preferably have bevel faces $g^9$, as this construction economizes weight of metal. Normally, however, the spring-seat $G^1$ has no contact with the friction shoes except through the supporting arms $g^7$ which engage at their inner ends the central bearing shoulders $g^6$ of the friction shoes. By making the central bearing arms of the spring-seat or cap $G^1$ relatively thin and wide, as illustrated in the drawing, they are adapted also to have a slight flexure radially to accommodate the very slight outward or radial movement of the friction shoes, thus rendering it unnecessary for the shoulders of the friction shoes to slide against the inner ends of the supporting arms $g^7$.

K is the connecting rod which serves to hold all the parts assembled and the springs under an initial tension or compression. Its head $K^1$ preferably bears against the wedge H and its nut $K^2$ against the removable head plate $f^1$ of the friction shell F. The friction shell F also has a supplemental removable plate $f^2$ at its end, which serves as a centering boss for the larger spring and against which the outer end of the smaller spring bears.

M is the removable tie-plate or guide which supports the draft rigging and is removably secured to the draft sills by bolts $m$.

I claim:—

1. In a friction draft rigging, the combination with a friction shell, of friction shoes coacting therewith, a wedge for spreading said shoes, an opposing spring reacting at one end against said shoes and at the other end against said shell and pressure transmitting members acting centrally against the shoes for causing the opposing pressures of the wedge and spring to be exerted against the middle portions only of the shoes, substantially as specified.

2. In a friction draft rigging, the combination with a friction shell, of friction shoes within the shell, a wedge, and anti-friction rollers acting centrally against the friction shoes, and a principal spring reacting at one end against the friction shell and at its other end centrally against the friction shoes, substantially as specified.

3. In a friction draft rigging, the combination with a friction shell, of friction shoes within the shell, a wedge, and anti-friction rollers acting centrally against the friction shoes, and a spring reacting at one end against the friction shell and at its other end centrally against the friction shoes, said friction shoes having central bearing shoulders and said spring-seat having supporting arms engaging said central bearing shoulders of the friction shoes, substantially as specified.

4. In a friction draft rigging, the combination with a friction shell, of friction shoes within the shell, a wedge, and anti-friction rollers acting centrally against the friction shoes, and a spring reacting at one end against the friction shell and at its other end centrally against the friction shoes, said friction shoes having central bearing shoulders and said spring-seat having supporting arms engaging said central bearing shoulders of the friction shoes, said supporting arms being relatively thin and wide to adapt them for slight flexure under strain, substantially as specified.

JOHN F. O'CONNOR.

Witnesses:
H. M. MUNDAY,
EDMUND ADCOCK.